United States Patent
Chai et al.

(10) Patent No.: US 7,482,937 B2
(45) Date of Patent: Jan. 27, 2009

(54) VISION BASED ALERT SYSTEM USING PORTABLE DEVICE WITH CAMERA

(75) Inventors: Sek M. Chai, Streamwood, IL (US); Gregory A. Kujawa, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 311 days.

(21) Appl. No.: 11/277,377

(22) Filed: Mar. 24, 2006

(65) Prior Publication Data

US 2007/0222617 A1  Sep. 27, 2007

(51) Int. Cl.
*G08B 23/00* (2006.01)
(52) U.S. Cl. .................... 340/576; 348/158; 348/159; 348/373
(58) Field of Classification Search ............... 340/576, 340/439, 575; 701/36, 49; 348/143, 148, 348/158, 159, 373, 376
See application file for complete search history.

(56) References Cited

U.S. PATENT DOCUMENTS

| | | | |
|---|---|---|---|
| 6,717,518 B1 | 4/2004 | Pirim et al. | |
| 7,190,263 B2 * | 3/2007 | McKay et al. | 340/539.1 |
| 2002/0149695 A1 * | 10/2002 | Kayanuma | 348/375 |
| 2003/0096593 A1 | 5/2003 | Naboulsi | |
| 2003/0209893 A1 | 11/2003 | Breed et al. | |
| 2004/0110544 A1 * | 6/2004 | Oyagi et al. | 455/575.1 |
| 2004/0183685 A1 * | 9/2004 | Strumolo et al. | 340/575 |
| 2005/0030184 A1 | 2/2005 | Victor | |
| 2005/0032550 A1 | 2/2005 | Baratono et al. | |
| 2005/0219058 A1 * | 10/2005 | Katagiri et al. | 340/576 |
| 2006/0103513 A1 * | 5/2006 | Ihara et al. | 348/148 |
| 2007/0085674 A1 * | 4/2007 | Sharpe | 340/531 |

* cited by examiner

*Primary Examiner*—Thomas J Mullen

(57) ABSTRACT

An alert system is activated in response to an event by positioning a portable electronic device, a cellular telephone or PDA for example, such that a camera of the electronic device is orientated to capture images relating to a visual criterion by which the event is to be detected. Images relating to the visual criterion are processed to detect the event and an alert system is activated if an event is detected. In one application, the portable device is held in a holder in a vehicle and used to detect vehicle lane departure or driver drowsiness.

22 Claims, 4 Drawing Sheets

US 7,482,937 B2

VISION BASED ALERT SYSTEM USING PORTABLE DEVICE WITH CAMERA

BACKGROUND

It is well known that a significant number of accidents result from drivers of vehicles becoming distracted, drowsy or falling asleep, which results in many deaths and injuries. It is also known that safety may be improved by alerting a driver of pending danger.

A number of different physical criteria may be used to establish when a person is drowsy, including eye movement, a change in the duration and/or interval of eye blinking, head position (e.g. tilting), a physiological change (e.g., altered heartbeat or breathing) and the physical result of the driver falling asleep (e.g., a reduced grip of the steering wheel). Further, unintended movement of the vehicle from one lane to another may be an indication of a drowsy or distracted driver (unless, of course, a turn signal has been activated).

Some of these physical criteria, such as eye movement, blinking and lane departure, can be detected using cameras.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
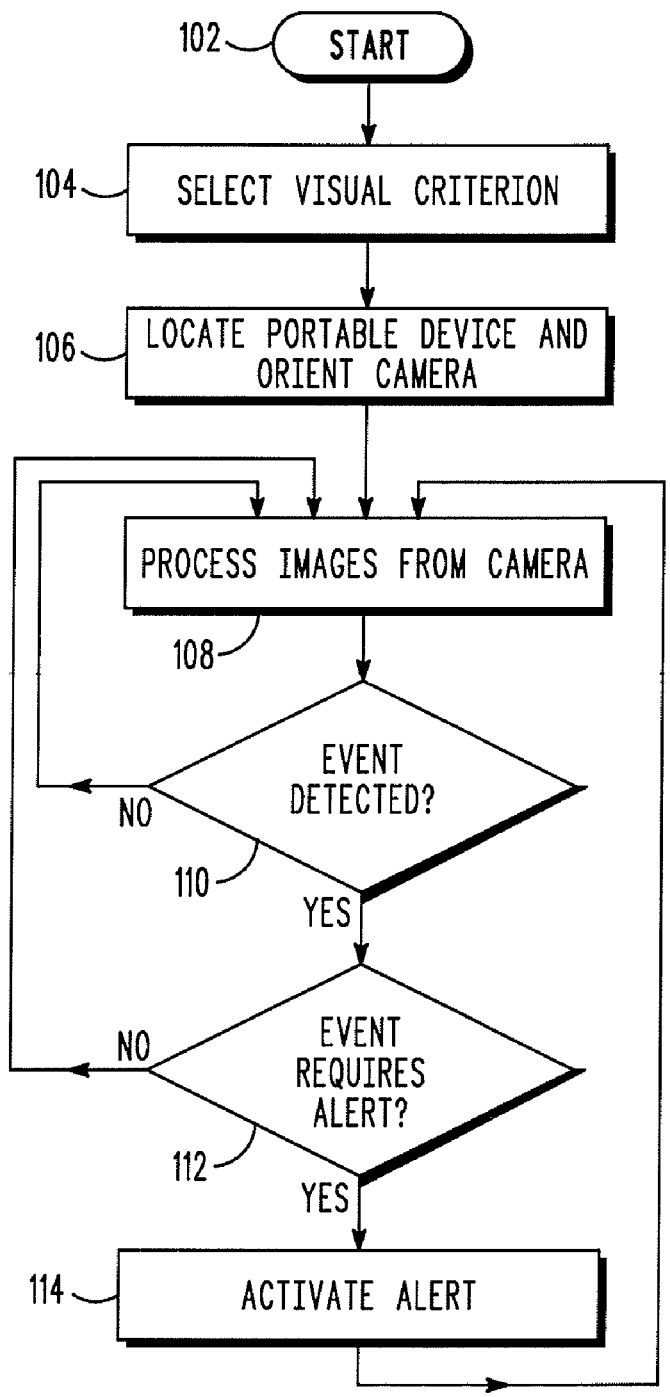
FIG. 1 is a flow chart of a method for alerting a person to an event consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

It is known that certain events can be detected automatically from video images. For example, drowsiness in the operator of a vehicle or other machine may be detected by processing camera images to detect physical criteria, such as eye movement and blinking. In another example, vehicle lane changes may be detected from images of the road in front of or behind the driver.

Detection systems include a camera for collecting images, an image processor for extracting salient features of the images, and decision logic to determine if a specified event has occurred (or is likely to occur). While these components are readily available, costs associated with their purchase, installation and use provide barriers to the commercialization of such systems.

One aspect of the present invention is the recognition that the basic components of a detection and alerting system are present in many portable electronic devices, such as cellular telephones, personal digital assistants and other portable electronic devices.

A flow chart of a method for alerting a person to an event is shown in FIG. 1. Referring to FIG. 1, following start block 102, a visual criterion by which the event to be detected is selected at block 104. At block 106 the portable electronic device is positioned such that a camera of the electronic device is orientated to capture images relating to the visual criterion. At block 108, the captured images are processed on a processor of the portable electronic device to extract relevant features. At decision block 110, a decision is made as to whether the event has occurred (or is likely to occur in the near future). If the event has occurred (or is likely to occur), as depicted by the positive branch from decision block 110, flow continues to decision block 112 where decision logic is used to determine if an alert is required. If an alert is required, as depicted by the positive branch from decision block 112, an alert is activated at block 114. If no event has occurred, as depicted by the negative branch from decision block 110, or if no alert is required, as depicted by the negative branch from decision block 112, flow returns to block 108.

The decision logic may additionally use information from sources other than the images captured by the camera, for example, weather and road conditions and vehicle state (such as speed) may be used to make the decision.

The event may be drowsiness in the person, in which case the camera is oriented towards the head of the person. Drowsiness may be detected by eye movement, blinking frequency/duration, head angle or other visual criteria. The person may be alerted using visual (a flashing light, for example), audio (beeping or other sound) or haptic (vibration, for example) cues.

The event may be a lane change by a motor vehicle. In this case, the camera is oriented towards the road. Features relating to lane markings or a road edge are extracted from the images and used to determine if the vehicle has moved out of its lane.

The event may be the driver operating the vehicle without enabling different aspects of the system. For example, the portable electronic device may detect that the vehicle alert system is disabled. In another embodiment, the event may be the driver leaving the motor vehicle without removing the portable electronic device. The associated alert reminds the driver to retrieve the portable electronic device.

In one embodiment the portable electronic device is positioned to detect motion, as in a security system, for example. The alert may be the sounding of an audio alarm, or the transmission of a message over a telephone or data network.

Figure 2:
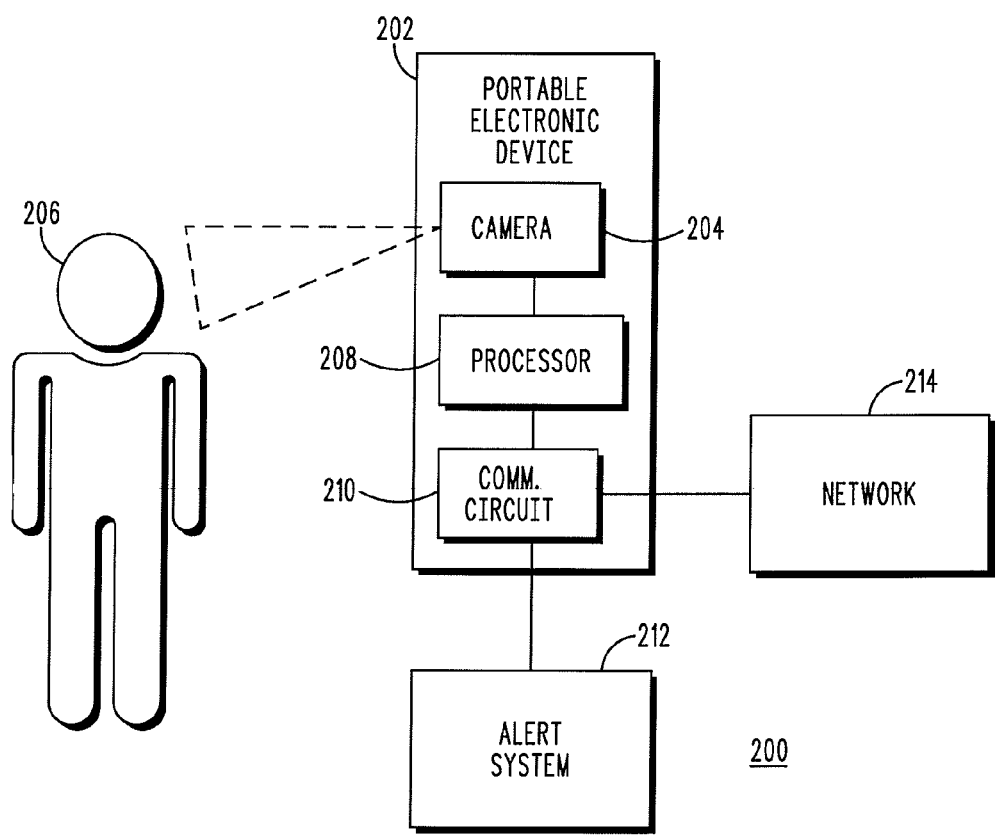
FIG. 2 is a diagram of an exemplary alert system consistent with certain embodiments of the invention.

FIG. 2 is a diagram of an exemplary alert system 200. Referring to FIG. 2, the alert system 200 includes a portable electronic device 202 that houses a camera 204 for capturing images of a visual characteristic, such as the head 206 of a person. The portable electronic device 202 also houses a processor 208 that is operable to process images from the camera 204. The portable electronic device 202 may also have a communication circuit 210 operable to provide communication with an external alert system 212 and/or a network 214. The communication circuit may use a wired or wireless communication link.

In one embodiment, the portable electronic device 202 is a cellular telephone. The communication circuit provides a cellular telephone link to a voice and/or data network 214 and may also provide a short range wireless link, such as a Bluetooth connection, to a local network 214 or the alert system 212. The alert system 212 may be an external alert system, or an alert system internal to the device. For example, the cellular telephone may activate a ring tone when an event is detected.

In a related embodiment, the user interface on the portable electronic device can be customized for each vehicle model and type. In a similar embodiment, the driver can select and personalize the settings on the portable electronic device based on the driver's preference in terms of the methods to alert the driver. Similarly, the driver's preference in terms of driving habits can be selected from the user interface on the portable electronic device. More generally, the user's interaction with the user interface may be used to select which application to execute and to select inputs to the application. These inputs may be data or control inputs that affect the operation of the application.

In a further embodiment, the portable electronic device 202 is a Personal Digital Assistant (PDA). The communication circuit 210 may provide a wireless Internet link and may also provide a short range wireless link, such as a Bluetooth connection, to a local network 214 or the alert system 212.

The network 214 may be a voice or data network. The data network may be a local network (such as a vehicle data network) or a wide area network (such as the Internet).

In an embodiment, the network 214 may be used to download the software application (the program of instructions) that is used in the method of FIG. 1. In this embodiment, the user may select from a list of software applications that can be downloaded onto the portable electronic device such that the downloaded software application updates the processing blocks (108, 110, 112, 114). For example, the user may select and download from a list applications related to drowsy driver detection using the network 214. The process of software application selection and download may result in a business transaction in which the application is purchased for use on the portable electronic device.

The network 214 may also be a vehicle network in which processors that control vehicle operation reside. In such an embodiment, the portable electronic device 202 may send control signals through the network 214 such as to change certain aspects that pertain to vehicle operation. For example, referring to FIG. 1, the portable electronic device 202 may turn on the external vehicle lighting to improve the brightness and quality of the image for processing 108. In yet another example and referring to FIG. 1, the portable electronic device 202 may enable the turn signals when the event related to an unintended lane change is detected at decision block 110.

Figure 3:
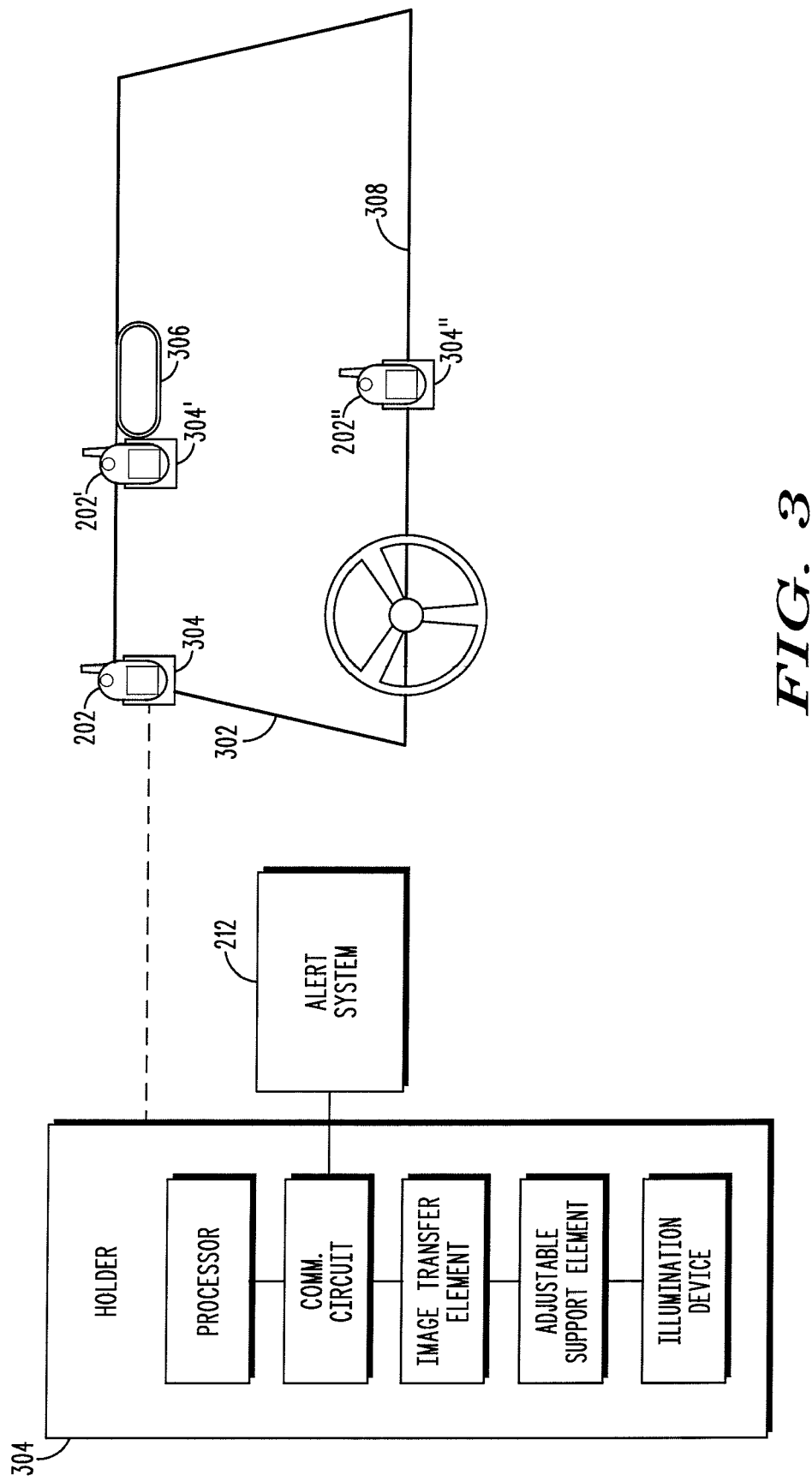
FIG. 3 is a further diagram of an exemplary alert system in a vehicle consistent with certain embodiments of the invention.

In some applications, it is desirable for the portable device to be operated 'handsfree'. This is the case, for example, when the person is operating a machine, flying an aircraft or driving a vehicle. An example configuration is shown in FIG. 3. Referring to FIG. 3, a portable digital device (202, 202', 202") is located inside of a vehicle. The portable digital device (202, 202', 202") is held in position at the periphery of a windscreen 302 by means of a holder (304, 304', 304"). The holder maintains the portable electronic device in a position such that the specified visual characteristic can be captured by the camera. In a vehicle, the holder may be attached to the rear view mirror 306, dashboard 308 or windscreen 302 of the vehicle, for example. The holder 304 may include the capability to charge and/or power the portable electronic device or to connect the portable electronic device to an information system of the vehicle (either via a wired or wireless connection). In the latter case, the portable electronic device 202 may receive information (such as speed, turn signal activation) from the vehicle information system. This information may be used to adjust the alert sensitivity. Also, the portable electronic device may communicate the likelihood of event occurrence to the vehicle information system. The vehicle can respond by activating alerts and/or performing actions such as slowing down or activating turn signals.

The portable electronic device may communicate with the alert system via the holder.

In one embodiment, the holder is operable to adjust the orientation of the portable electronic device automatically. For example, the position of a visual feature within one or more image frames may be used as a measure of orientation. The holder may be rotated to move the visual feature to a preferred position within the frame. In another embodiment, the holder position may be adjusted by the user to adjust the orientation of the portable electronic device based on feedback provided by the portable electronic device. This feedback may include a visual interface on the display on the portable electronic device to indicate the proper orientation for operation of the application. In another example, this feedback may be an audible signal operable through the loudspeaker on the portable electronic device.

In a related embodiment, the holder may incorporate lighting capability to illuminate the area in which the camera on the portable electronic device is aimed. For example, referring to FIG. 1, the holder may include infrared LEDs to illuminate the driver so that image contrast is improved for processing 108. In this example, the operation of the LEDs are controlled by the portable electronic device.

The portable electronic device may have access to an external network, such as the Internet, from which external environmental information (traffic and weather reports for example) may be received and used to adjust alert sensitivity.

In an embodiment where the portable electronic device is a cellular telephone, the operation of the telephone may be controlled by the alert system. For example, if a lane change is detected incoming telephone calls may be routed to voice mail or delayed.

Part of the image processing and event detection may be performed external to the portable electronic device. For example, the holder (304 in FIG. 3) may include a data processor.

In FIG. 3, the camera of the portable electronic device is oriented towards the driver of the vehicle. In a further embodiment, the camera of the portable electronic device is oriented towards the road ahead of the vehicle, so as to capture images from which the position of the vehicle on the road can be determined. For example, road edges or line markers may be identified and used to detect when the vehicle changes lanes. A determination is then made as to whether the lane change was intentional, and an alert is sounded if it is determined that the lane change is unintentional. For example, if a turn signal is activated the alarm is not activated.

The holder 304 includes a means, such as a clip or pouch, for supporting a portable electronic device such that a camera of the portable electronic device is oriented to capture images relating to a visual characteristic of the event. In one embodiment, the holder includes a means, such as an electrical or optical connector, for transferring images from the portable device to the holder and a processor for processing the images transferred from the portable electronic device. The images are processed to detect the event. The processing may be shared between the processor of the holder and the processor of the portable electronic device. Once an event is detected, a communication circuit in the holder is used to signal an alert system. The communication circuit may drive a wired or wireless link. Additionally, the holder may operate to couple the portable electronic device to a power supply so that the portable electronic device may be operated without loss of battery power. The power supply may be used to charge the battery of the portable electronic device.

Figure 4:
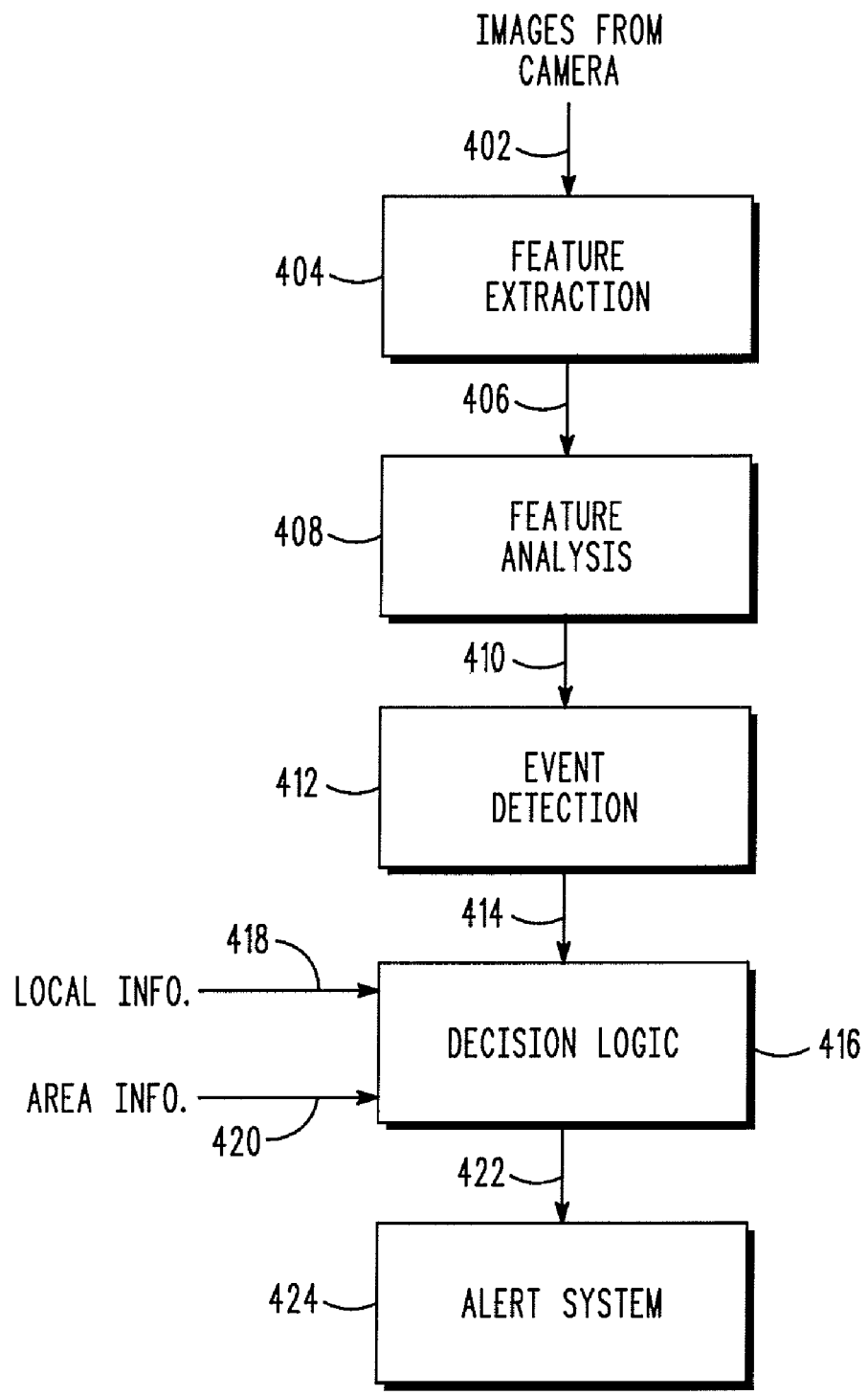
FIG. 4 is a signal flow diagram of an exemplary alert system consistent with certain embodiments of the invention.

FIG. 4 is a signal flow diagram of an exemplary alert system consistent with certain embodiments of the invention. Referring to FIG. 4, images 402 are received from a camera of the portable electronic device. Feature extraction module 404 operates to identify and extract specific features in the images. A description 406 of the features is passed to a feature analysis module 408 that operates to analyze the features with respect to a selected visual criterion of an event. The results 410 of the analysis are passed to an event detection module 412 that determines the likelihood 414 of an event having occurred. A decision logic module 416 uses the event likelihood 414 together with local information 418 and area information 420 to decide if an alert should be activated. The local information may be, for example, the operating state of a vehicle and may include parameters such as the speed of the vehicle, the position of turn indicators and outside temperature. This information may be received from a vehicle data bus for example. The area information may include traffic and weather conditions in the surrounding area. This information may be received by the portable electronic device from a wide area network, such as the Internet. If it is decided that an alert is appropriate, a signal 422 is sent to the alert system 424. The alert system may be part of the portable electronic device or it may be an external alert system.

Those of ordinary skill in the art will recognize that the present invention has been described in terms of exemplary embodiments based upon the use of portable electronic devices such as personal digital assistants and cellular telephones. However, the invention should not be so limited, since the present invention could be implemented using other camera-enabled portable electronic devices, such as digital audio devices.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for activating an alert in response to an event, the method comprising:
    positioning a portable electronic device such that a camera of the electronic device is orientated to capture images relating to a visual criterion by which the event is to be detected;
    processing the images relating to the visual criterion on a processor of the portable electronic device to detect the event;
    activating an alert related to the event based upon an output signal of the portable electronic device;
    downloading a program of instructions to the portable electronic device via a wireless communication link; and
    executing the program of instructions on the processor of the portable electronic device.

2. A method in accordance with claim 1, wherein the portable electronic device is positioned in a vehicle and wherein the visual criterion comprises the position of the vehicle on a road.

3. A method in accordance with claim 1, wherein the portable electronic device is positioned in a vehicle and wherein positioning the portable electronic device comprises mounting the portable electronic device in a holder attached to the vehicle.

4. A method in accordance with claim 3, wherein positioning the electronic device is performed automatically by the holder.

5. A method in accordance with claim 1, wherein activating the alert based upon the output signal of the portable electronic device comprises emitting sound from a loudspeaker of the portable electronic device.

6. A method in accordance with claim 1, wherein activating the alert based upon the output signal of the portable electronic device comprises signaling an alert system external to the portable electronic device.

7. A method in accordance with claim 6, wherein signaling an alert system external to the portable electronic device comprises signaling via a wireless communication link.

8. A method in accordance with claim 6, wherein the alert system is selected from a group of alert systems consisting of an audio system, a visual system and a haptic system.

9. A method in accordance with claim 1, wherein the portable electronic device is positioned in a vehicle and further comprising:
    the portable electronic device receiving vehicle information from the vehicle; and
    the portable electronic device using the vehicle information to assist the detection of an event.

10. A method in accordance with claim 1, wherein the portable electronic device is positioned in a vehicle and further comprising the portable electronic device transmitting information to the vehicle.

11. A method in accordance with claim 1 further comprising:
    presenting a user interface to a user of the portable electronic device; and
    selecting the program of instructions from a plurality of programs of instructions dependent upon the user's interaction with the user interface.

12. A method in accordance with claim 1 farther comprising:
    presenting a user interface to a user of the portable electronic device; and
    selecting input values for the program of instructions dependent upon the user's interaction with the user interface.

13. A system for activating an alert in response to an event, the system comprising:
    a portable electronic device comprising a camera, a processor, and a communication circuit; and
    an alert system adapted to generate an alert signal in response to a signal from the communication circuit of the portable electronic device;
    wherein the processor of the portable electronic device is operable to process images from the camera, detect the event from features of the images, and control the communication circuit to signal the alert system if the event is detected,
    wherein the processor is further operable to download a program of instructions to the portable electronic device via a wireless communication link and to execute the program of instructions.

14. A system in accordance with claim 13, wherein the portable electronic device comprises a cellular telephone.

15. A system in accordance with claim 14, wherein the cellular telephone further comprises a loudspeaker and wherein the alert system comprises the loudspeaker of the cellular telephone.

16. A holder of a system for activating an alert in response to an event, the holder comprising:

a support element operable to support a portable electronic device and orient a camera of the portable electronic device to capture images relating to a visual characteristic of the event;

an image transfer element operable to transfer images from the portable device to the holder; and a communication circuit operable to couple the holder to an alert system.

17. A holder in accordance with claim 16, wherein the orientation of the holder is adjusted automatically to orient the camera of the portable electronic device.

18. A holder in accordance with claim 16, wherein the holder is operable to orient the camera of the portable electronic device.

19. A holder in accordance with claim 16, wherein the holder further comprises a processor and wherein the processor of the holder and the portable electronic device jointly process images from the camera, detect the event from features of the images and control the communication circuit to signal the alert system if the event is detected.

20. A holder in accordance with claim 16, wherein the holder is operable to illuminate the field of view of the camera.

21. A holder in accordance with claim 16, wherein the holder further comprises a processor operable to process images from the camera, detect the event from features of the images and control the communication circuit to signal the alert system if the event is detected.

22. A method for activating an alert in response to an event, the method comprising:

positioning a portable electronic device such that a camera of the electronic device is orientated to capture images relating to a visual criterion by which the event is to be detected;

processing the images relating to the visual criterion on a processor of the portable electronic device to detect the event; and activating an alert related to the event based upon an output signal of the portable electronic device, wherein the event comprises the appearance of drowsiness of a person and wherein the visual criterion relates to the person's eyes.

* * * * *